United States Patent Office 3,170,478
Patented Feb. 23, 1965

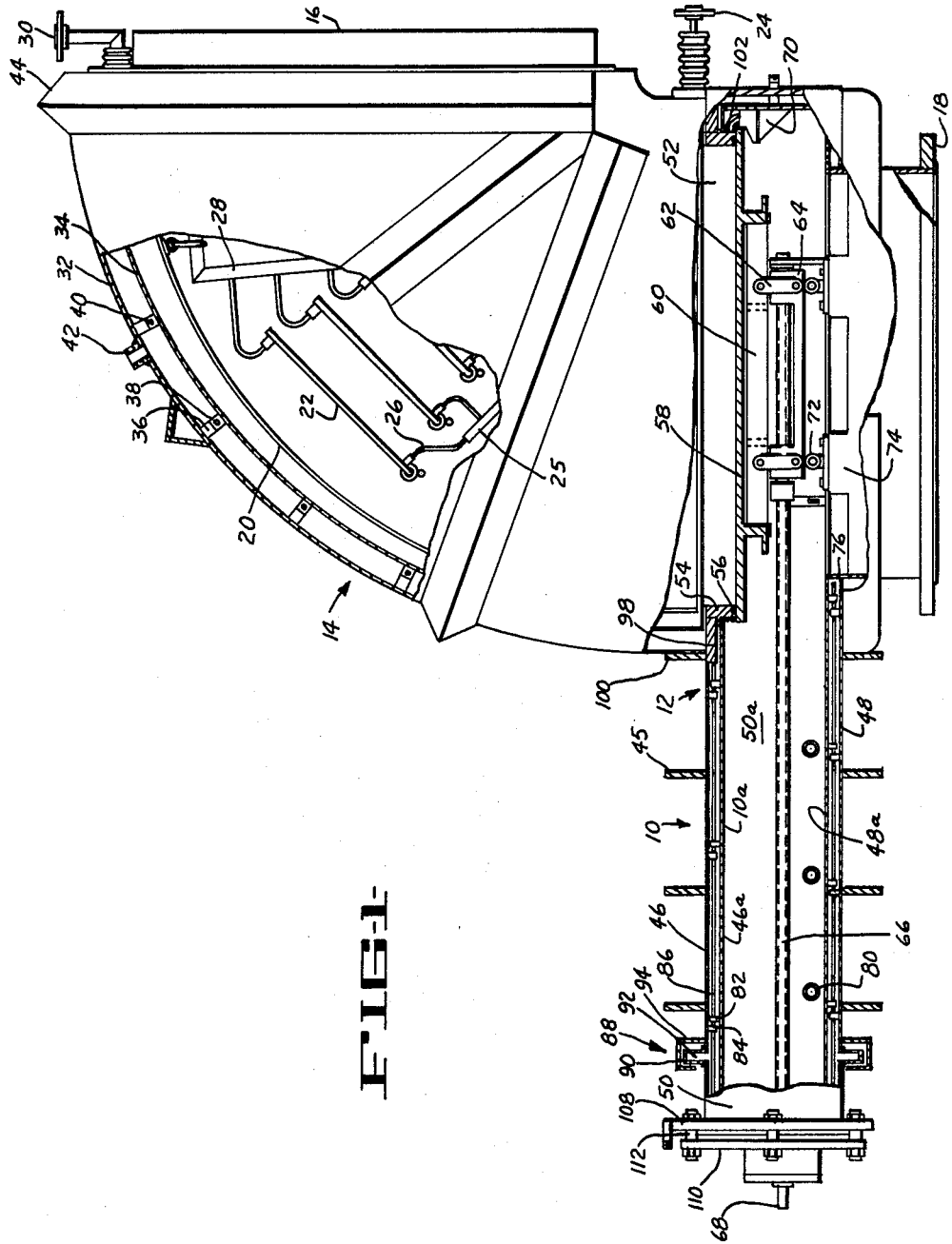

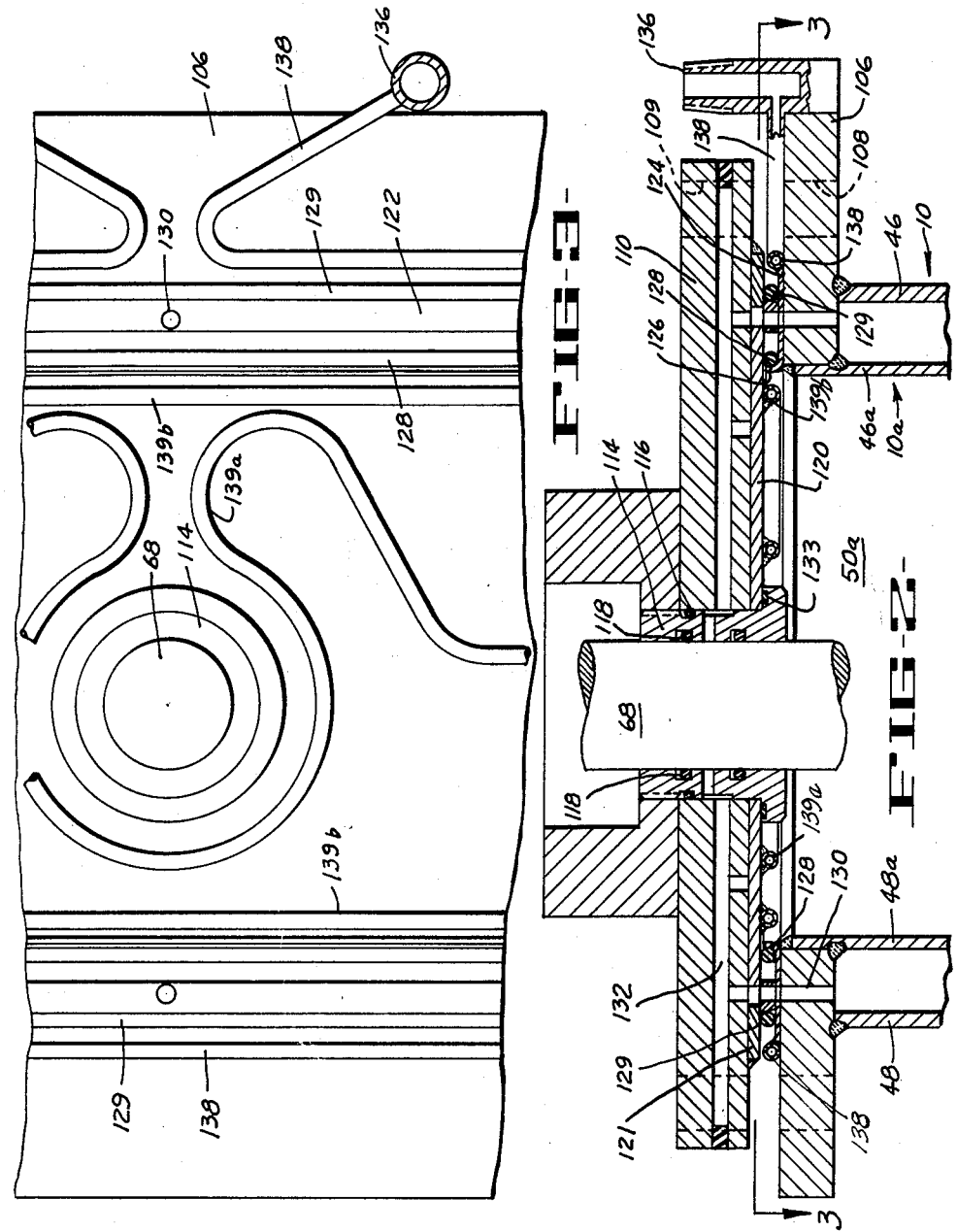

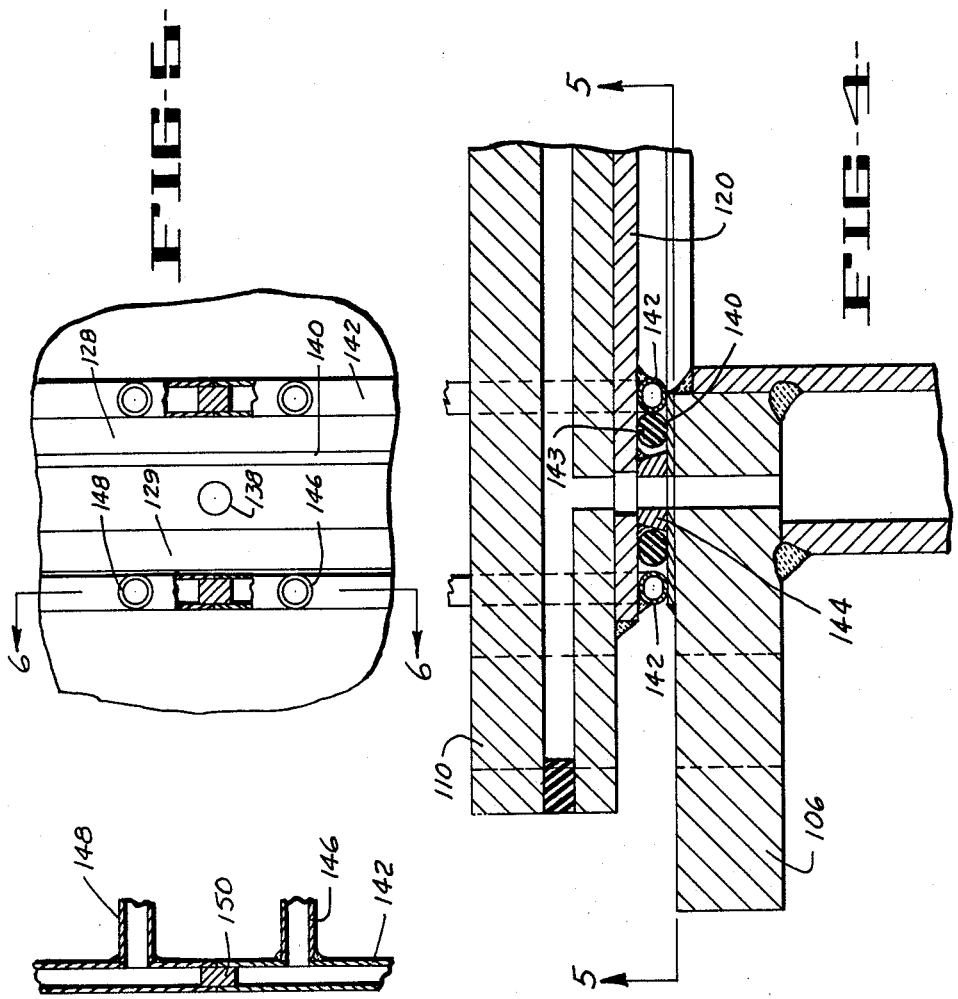

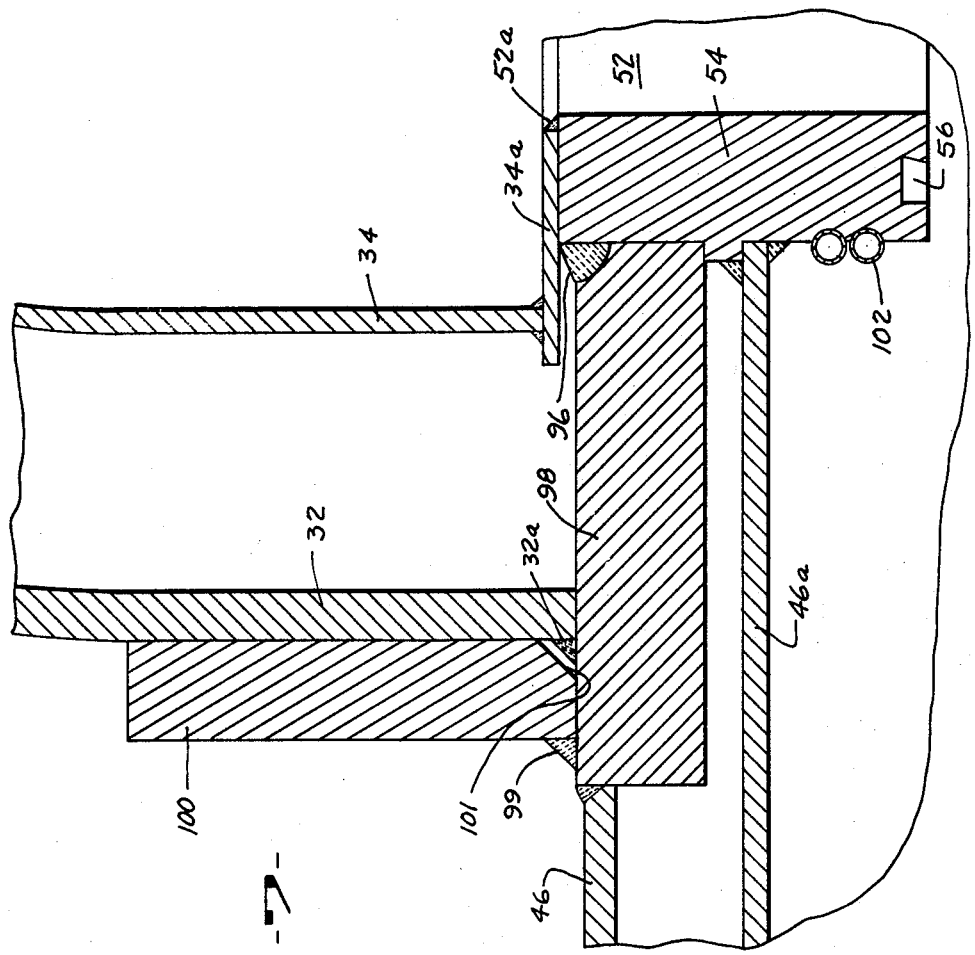

3,170,478
VALVE CONSTRUCTION
Austin U. Bryant, Walnut Creek, Calif., assignor to Grove Valve and Regulator Company, Oakland, Calif., a corporation of California
Filed Feb. 8, 1963, Ser. No. 257,143
6 Claims. (Cl. 137—340)

This invention relates to a valve and, more particularly, to a gate valve construction the materials of which are subjected to severe temperatures.

In certain evacuation systems employing vacuum pumps, it is frequently desirable to pass the gases being evacuated over cold panels in order to freeze and settle out those molecular components of the gas that are susceptible to a change of physical state at extremely low temperatures. At the same time, it is desirable to heat metals and other materials employed in other portions of the evacuation system in order to drive off and evacuate molecules that are absorbed within the metals themselves, and this is an important consideration when it is desired to maintain a high vacuum in the order of $10^{-6}$ millimeters of mercury. However, the application of cold and heat to the metals of the duct system and the valve associated therewith subjects the metals to varying degrees of expansion or contraction and the heat may affect the rubber seals and other elements adversely. Additionally, it is generally found desirable to make the ducts and the valve body of double-walled construction in order to minimize heat and cold losses. Consequently, the inner and outer walls of these structures are caused to expand or contract differentially in accordance with the different temperatures to which they are exposed, thus raising additional problems of structural design.

It is, therefore, an object of this invention to provide means for cooling seals and other elements exposed to high temperatures.

It is a further object of this invention to provide a bonnet construction for a heated valve including a coolant circulating system for reducing the temperature to which rubber seals are exposed.

It is a further object of this invention to provide means for accommodating differential thermal expansion or contraction between attached parts.

In carrying out this invention I provide a tubing system in the bonnet through which water or other suitable coolant may be circulated in order to reduce the temperature thereof and hence protect seals of rubber or similar material which would otherwise be exposed to high temperature. Additionally, expansion joints are provided in the walls of the valve body in order to accommodate thermal expansion.

Other objects and advantages of this invention will become apparent from the description following when read in conjunction with the accompanying drawing wherein:

FIG. 1 is a side view partially in section showing a gate valve and attached cold chamber for vacuum system embodying features of this invention;

FIG. 2 is a partial section view of a bonnet showing the coolant circulating system forming a part of this invention;

FIG. 3 is a fragmentary section view taken along line 3—3 of FIG. 2.

FIG. 4 is a fragmentary section view of another form of bonnet circulating system;

FIG. 5 is a fragmentary section view taken along line 5—5 of FIG. 4.

FIG. 6 is a section view taken along line 6—6 of FIG. 5; and

FIG. 7 is an enlarged section view of the joint between valve and cold chamber.

Referring now to FIG. 1, there is shown a gate valve 10 connected at 12 to a cold chamber 14 which, in turn, is adapted to be connected at 16 to a chamber (not shown) to be evacuated by a suitable vacuum pump (not shown) connected to the valve at 18.

The cold chamber 14 is provided to expose the molecules of gases being evacuated through the intake 16 to cold surfaces which freeze and settle out certain components of the gases such as water vapor and oil vapor and the like. The cold chamber may take a variety of forms but preferably comprises an inner shell or cold trap 20 and series of baffle plates 22 all of hollow construction so that a cryogenic fluid such as liquid nitrogen may be circulated throughout the cold shell and the baffles. The coolant flows into the cold surface system at 24, and then into the cold shell 20 and an intake manifold 25 from which it flows through inlet tubes and through the baffles 22 flowing out through the manifold tubing 28 and outlet 30.

In order to facilitate the maintenance of a high vacuum within the cold chamber 14 and to provide insulation between the cold interior and the surrounding atmosphere, it is formed of double-walled construction having an outer shell 32 and inner shell 34 which are connected together by lugs 36 and 38 welded to each of the shells and connected together by a rod 40 extending through aligned enlarged openings in the lugs. Thus, the inner shell is suspended within the outer but the connection between the rod and lugs permits relative movement along the rod and transverse thereto such as may be occasioned by thermal expansion or contraction of the outer and inner shells 32 and 34.

A suitable connection 42 is provided to introduce a "rough" or intermediate vacuum between the two shells in order to reduce the possibility of vacuum loss through leakage. Preferably the vacuum between the shells 32 and 34 is maintained in the order of $10^{-3}$ millimeters of mercury while the vacuum within the cold chamber is in the order of $10^{-6}$ to $10^{-8}$ millimeters of mercury. Additionally, the cold chamber 14 is preferably strengthened by means of ribs 44 of angle section which resist external force effects of pressure difference both radially and circumferentially because of the thick reinforcement ribs presented by the legs of the angle.

The particular type of valve employed in the vacuum system may take a variety of forms, but for purposes of illustration, I have shown a gate valve having double-walled body 10 and 10a reinforced by hoops 45 and including top walls 46 and 46a, bottom walls 48 and 48a and side walls 50 and 50a. Around the opening 52 comprising the flow passage from the cold chamber, I have provided a circular valve seat 54 having a seal member 56 with which the gate 58 is adapted to cooperate in closing off the vacuum. The particular means for operating the gate is not a feature of this invention but may comprise a motion transmitting member 60 on the under side of the gate to which a traverse member 64 is attached by toggle links 62. The traverse member 64 is threadedly engaged on the elongated screw 66 which is rotated by turning the stem 68 by any suitable means such as a wheel (not shown) so that the traverse member moves along the screw to bring the valve gate 58 from an open position displaced from the valve seat 54 to the closed position shown in FIG. 1. Then, when the valve seat is covered the end of the valve engages a stop block 70 secured to the end of the valve body so that further movement of the traverse member 64 will cause the lower end of the toggle link 62 to swing forward forcing the gate against the seat, any tendency for the traverse member to move downward being resisted by rollers 72 carried on a beam 74 extending across the outlet flow passage 76.

As has previously been described, it is desirable in a vacuum system to apply heat to the metal elements in order to drive off certain components, such as water or the like that are absorbed in the metals of the elements. When it is desired to maintain a vacuum of the order intended here, this is an extremely important feature and may be accomplished by providing a heating element or the like in each of a series of hollow tubes 80 extending across the interior of the valve body. However, the introduction of this heat to the elements of the valve creates certain problems to which this invention is particularly directed. For example, the heat within the valve body 10 to which the inner valve body 10a is exposed produces differential thermal expansion thereof relative to the outer body 10 which is exposed to a substantially lower temperature, e.g., room temperature. As a consequence, the inner walls are attached to the outer walls so as to permit relative sliding to accommodate such relative expansion. This is accomplished by attaching a series of aligned lugs or eye blocks 82 to the outer surface of the inner valve body 10a and a similar series of aligned eye blocks 84 to the inner surface of the outer valve body 10 with a rod 86 being loosely received through the aligned enlarged openings of the eye blocks. Consequently, the inner and outer walls are attached relative to each other but may expand or contract relatively with the eye blocks moving along or transverse to the rod 86. Also provided in the outer wall is an expansion joint 88 comprising a channel member 90 of relatively thin metal welded across a gap 92 around the outer valve body so that the channel member 90 can expand or contract in order to accommodate relative contraction and expansion between the inner and the outer valve bodies. Preferably, the bendable expansion member 90 is protected by means of a similar but larger channel member 94 which embraces the channel member 90 and is secured to the outer valve body to form a shield.

Preferably, all of the valve and cold chamber components which are exposed to the gas molecules being evacuated are of stainless steel, and for purposes of economy in manufacture, are of relatively thin gauge. Where necessary to reinforce the stainless steel, heavy gauge carbon steel is provided and, in turn, shielded from the flow passageway by stainless steel components. For example, referring to FIG. 7 the valve seat 54 is the only component of heavy gauge stainless steel in order to resist the forces exerted by the valve gate 58. The inner shell 34 of the cold trap is welded to a bottom plate 34a having a circular opening 52a conforming to the flow passage 52 and the plate 34a is, in turn, welded to the seat ring 54 to seal against leakage. The seat ring is welded at 96 to a plate 98 of carbon steel or the like that extends across the valve body and is supported on the heavier side and end walls of the outer valve body 10. Across the valve body 10 the plate 98 is welded at 99 to a reinforcing rib 100. The outer shell 32 is also welded to the beam 98 at 32a and obviously, it must be welded to the beam 98 first since otherwise the seam for the weld 32a would be inaccessible. For that purpose, a clearance 101 is provided to insure the placement of the reinforcement rib 100. It is to be noted that the bottom plate 34a is spaced above the beam 98 so that any thermal expansion or contraction of the cold trap 34 will be absorbed in free bending movement of the plate 34a in either direction about the top of the seat ring 54. As another feature of this invention I provide a series of tubes 102 around the valve seat 54 through which water or other coolant may be circulated in order to insure that the rubber seals 56 do not become overly hot or cold.

Referring now to FIGS. 2 and 3 I disclose the structure of the bonnet which forms a particular feature of this invention. The spaces between the inner and outer walls 10 and 10a of the valve body are closed by a flange plate 106 having bolt holes 108 which are aligned with similar holes 109 in bonnet plate 110 so that it may be secured thereto by bolts 112 (FIG. 1). As is customary, a journal member 114 is mounted in the bonnet plate 110 and sealed against leakage by suitable means such as O-rings 116, additional O-rings 118 being provided to seal around the stem 68.

The bearing member 114 is formed of stainless steel and the top flange 106 and bonnet plate 110 are preferably formed of a heavy gauge material such as carbon steel. Therefore, in order to prevent exposure of the carbon steel to the vacuum within the inner valve body 10a, a sheet of stainless steel 120 is interposed between the flange 106 and the bonnet plate 110, the edges of the sheet 120 being supported on a supporting rib 122 carried on the flange 106. Actually, the supporting rib 122 is welded or otherwise secured to a gasket 124 which surrounds the bonnet opening and which is formed of stainless steel having an upturned lip around the inner periphery thereof 126 in order to support a sealing O-ring 128 during assembly of the valve. The other seal ring 129 being supported on the sloping side of the supporting rib 122 to seal between the gasket 124 and a frame 121 surrounding the sheet 120 and welded to the bonnet plate 110 against leakage.

A series of passageways 130 are formed through the flange 108, supporting rib 122 and stainless steel plate 120 to connect the space between inner and outer shells 10 and 10a with similar passageways formed in the bonnet plate 110. Thus, a "rough" or intermediate vacuum surrounds not only the side walls 48a, 46a and 50a but the bonnet as well and the O-rings 128 and 129 are provided to prevent leakage from atmosphere to the intermediate vacuum and from the intermediate vacuum to the high vacuum. Of course the retainer gasket is welded at both edges to insure against leakage under it.

Because of the heat within the valve body introduced by heating means 80, the various O-rings and seals in the bonnet structure are susceptible to heat damage and means are provided in conjunction with the bonnet structure for cooling them.

Thus, an intake pipe 136 is secured to the side of the flange plate 106 and tubing at 138 is provided to extend completely around the gasket member to an outlet not shown. Other tubing 139a and 139b extends around the bearing member 114 and across the bonnet closure plate, respectively, it being welded to the underside of the liner plate 120. Water or other suitable coolant is circulated through the tube to maintain the metals and, seal rings immediately adjacent thereto at a moderate temperature.

In another form of this invention shown in FIGS. 4 to 6, parallel tubes 142 are welded to the bonnet liner 120 opposite the gasket 140 surrounding the bonnet opening. A cooling medium may be circulated through the tubes to retain the seal rings 143 at a moderate temperature. As in the other embodiment the stainless steel intermediate plate 120 is supported on the rib 144. In this case, inlet and outlet tubes 146 and 148 may be welded to the main tube 142 which is arranged in a continuous loop with the ends thereof being welded together after placement of a plug 150 to prevent complete circulation and to form the end of conduit.

While I have described this invention in connection with a preferred embodiment thereof, it is understood that modification and changes therein can be made by those skilled in the art without departing from the spirit and scope of this invention as defined by the claims appended hereto.

Having described my invention I claim:

1. In a valve structure including a valve body having a bonnet opening and heating means within said valve body, a bonnet structure comprising:

a flange plate around said bonnet opening, a gasket secured to said flange plate around said bonnet opening, a bonnet plate secured to said flange plate, a seal ring of rubber or the like between said bonnet plate and said gasket, an elongated tubular member secured around said gasket adjacent said seal ring, and an inlet conduit for a liquid coolant connected to said tubular member.

2. In a valve structure including a valve body having a bonnet opening and heating means within said valve body, a bonnet structure comprising:

a flange plate around said bonnet opening, a gasket secured to said flange plate around said bonnet opening, a bonnet plate secured to said flange plate, means in said bonnet plate rotatably mounting a valve operating member, a seal ring of rubber or the like between said flange plate and said gasket and additional seal means on said rotatably mounting means, an elongated tubular member secured around said gasket adjacent said seal ring and adjacent the inner surface of said bonnet plate to traverse said inner surface in a circuitous path around said mounting means, and an inlet conduit for a liquid coolant connected to said tubular member.

3. A valve body stucture comprising outer walls of a first material, inner walls formed of a second material extending beyond said outer wall, a flange plate of said first material welded around said inner walls, a gasket of said second material welded to said flange plate around said inner walls, a bonnet plate of said first material extending outside said gasket and being secured to said flange plate, a bonnet liner of said second material interposed between said gasket and said bonnet plate to isolate said bonnet plate from the interior of said inner walls, a journal member extending through said bonnet plate and said bonnet liner rotatably supporting a valve operating member, seal members of rubber or the like between said bonnet liner and said gasket and between said bonnet liner and said journal member, an elongated tubular member secured to the inner surface of said bonnet liner to extend over said inner surface adjacent to said gasket and around said journal member, and an inlet conduit for a liquid coolant connected to said tubular member.

4. The valve body structure defined in claim 3 wherein:

said outer walls are in two sections separated by a gap therearound, and an extensible expansion joint extending across said gap connecting said two sections.

5. The valve body structure defined in claim 4 wherein said expansion joint comprises a channel shaped member of thin bendable material welded around said valve body and bridging said gap with one leg thereof secured to each of said outer wall sections.

6. The valve structure defined in claim 3 wherein said gasket comprises a continuous strip of said second material and a tubular member of said second material is welded around the inner periphery thereof to form a seal retaining member, a plug in said tubular member, the ends of said tubular member being connected together and inlet and outlet tubes connected to said tubular member on opposite sides of said plug.

References Cited in the file of this patent

UNITED STATES PATENTS

| | | |
|---|---|---|
| 1,951,677 | Rosener | Mar. 20, 1934 |
| 2,121,686 | Currie | June 21, 1938 |
| 3,019,809 | Ipsen et al. | Feb. 6, 1962 |